US012619882B2

(12) United States Patent
    Amad

(10) Patent No.: US 12,619,882 B2
(45) Date of Patent: May 5, 2026

(54) DECISION TREE OF MODELS: USING DECISION TREE MODEL, AND REPLACING THE LEAVES OF THE TREE WITH OTHER MACHINE LEARNING MODELS

(71) Applicant: Ford Global Technologies, LLC, Dearborn, MI (US)

(72) Inventor: Hassan Fayez Amad, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1003 days.

(21) Appl. No.: 17/131,035

(22) Filed: Dec. 22, 2020

(65) Prior Publication Data

US 2022/0198282 A1 Jun. 23, 2022

(51) Int. Cl.
  *G06N 5/01* (2023.01)
  *G06F 18/21* (2023.01)
  *G06F 18/214* (2023.01)
  *G06N 3/045* (2023.01)
  *G06N 3/084* (2023.01)

(52) U.S. Cl.
  CPC ............. *G06N 5/01* (2023.01); *G06F 18/214* (2023.01); *G06F 18/217* (2023.01); *G06N 3/045* (2023.01); *G06N 3/084* (2013.01)

(58) Field of Classification Search
  CPC .......... G06N 5/01; G06N 3/045; G06N 3/084; G06N 3/04; G06N 20/20; G06N 3/08; G06F 18/214; G06F 18/217; G06F 18/254; G06F 18/24323
  See application file for complete search history.

(56) References Cited

U.S. PATENT DOCUMENTS

| | | | |
|---|---|---|---|
| 6,883,148 B1 | 4/2005 | Teig et al. | |
| 7,107,254 B1 | 9/2006 | Dumais et al. | |
| 9,678,730 B2 | 6/2017 | Dunn et al. | |
| 2019/0065951 A1* | 2/2019 | Luo | G08G 1/166 |

FOREIGN PATENT DOCUMENTS

WO    WO-2019194787 A1 * 10/2019    ........... G06K 9/6256

OTHER PUBLICATIONS

Yildiz, Omnivariate Decision Tree, IEEE Transactions on Neural Networks, vol. 12, No. 6, Nov. 2001 (Year: 2001).*
Vettigli, From simple regression to multiple regression with decision trees, Cambridge Spark, 2018 (Year: 2018).*
Medina-Chico Backpropagation in Decision Tree for Regression, ECML 2001, LNAI 2167, pp. 348{359, 2001. (Year: 2001).*

(Continued)

*Primary Examiner* — Usmaan Saeed
*Assistant Examiner* — Su-Ting Chuang
(74) *Attorney, Agent, or Firm* — Christopher Storms; Harrity & Harrity, LLP

(57) ABSTRACT

Described are techniques of generating and training a neural network that include training multiple models and constructing multiple decision trees with said models. Each decision tree may include additional decision trees at various levels of that decision tree. Each decision tree has a different accuracy indicator due to the unique structuring of each decision tree, and by testing each tree through a testing dataset, the tree with the highest accuracy can be determined.

20 Claims, 7 Drawing Sheets

300

| Generate a plurality of models |
|---|
| 302 |

↓

| Split a dataset into a first set of training data and a second set of testing data |
|---|
| 304 |

↓

| Train each model of the plurality of models using the first set of training data to generate a plurality of trained models |
|---|
| 306 |

↓

| Construct a plurality of decision trees, the plurality of decision trees comprising one or more trained models of the plurality of trained models, wherein each of the plurality of decision trees is unique |
|---|
| 308 |

↓

| Test each of the plurality of decision trees with the second set of training data to generate an accuracy result for each decision tree of the plurality of decision trees |
|---|
| 310 |

↓

| Deploy a decision tree of the plurality of decision trees having a highest accuracy result. |
|---|
| 312 |

(56) References Cited

OTHER PUBLICATIONS

Sethi Entropy Nets: From decision trees to neural networks, Proc. IEEE, vol. 78, pp. 1605-1613, 1990 (Year: 1990).*

Azevedo, "Iterative Reordering of Rules for Building Ensembles Without Relearning", 10th International Conference DS2007, Discovery Science, p. 56-67, 2007 (Year: 2007).*

Gaul, "Decision Tree Constructed by Association Rules", "Classification and Information Processing at the Turn of the millennium", p. 245-253, Springer, 1999 (Year: 1999).*

Humbird ("Deep Neural Network Initialization With Decision Trees") arXiv:1707.00784v3 [cs.LG] Jul. 3, 2018 (Year: 2018).*

Pham ("On Cesaro Averages for Weighted Trees in the Random Forest") Journal of Classification (2020) 37:223-236 (Year: 2019).*

Dolotov ("Evolutionary algorithms for constructing an ensemble of decision trees") arXiv:2002.00721v1 [cs.NE] Feb. 3, 2020 (Year: 2020).*

Zahura ("Training Machine Learning Surrogate Models From a High-Fidelity Physics-Based Model: Application for Real-Time Street-Scale Flood Prediction in an Urban Coastal Community") Water Resources Research Research Article 10.1029/2019WR027038 (Year: 2020).*

Abdessalem ("Testing Advanced Driver Assistance Systems using Multi-objective Search and Neural Networks") ASE'16, Sep. 3-7, 2016, Singapore, Singapore (Year: 2016).*

Biau ("Neural Random Forests") arXiv:1604.07143v2 [stat.ML] Apr. 3, 2018 (Year: 2018).*

Bonab ("Less Is More: A Comprehensive Framework for the Number of Components of Ensemble Classifiers") IEEE Transactions on Neural Networks and Learning Systems, vol. 30, No. 9, Sep. 2019 (Year: 2019).*

Balestriero ("Neural Decision Trees") arXiv:1702.07360v2 [stat. ML] Mar. 6, 2017 (Year: 2017).*

Todorovski, L., et al., "Combining Multiple Models with Meta Decision Trees", In: Zighed D.A., Komorowski J., Żytkow J. (eds) In Proceedings of the 4th European Conference on Principles of Data Mining and Knowledge Discovery (PKDD 2000). Lecture Notes in Computer Science, vol. 1910, Year 2000, https://doi.org/10.1007/3-540-45372-5_6, pp. 54-64.

* cited by examiner

100
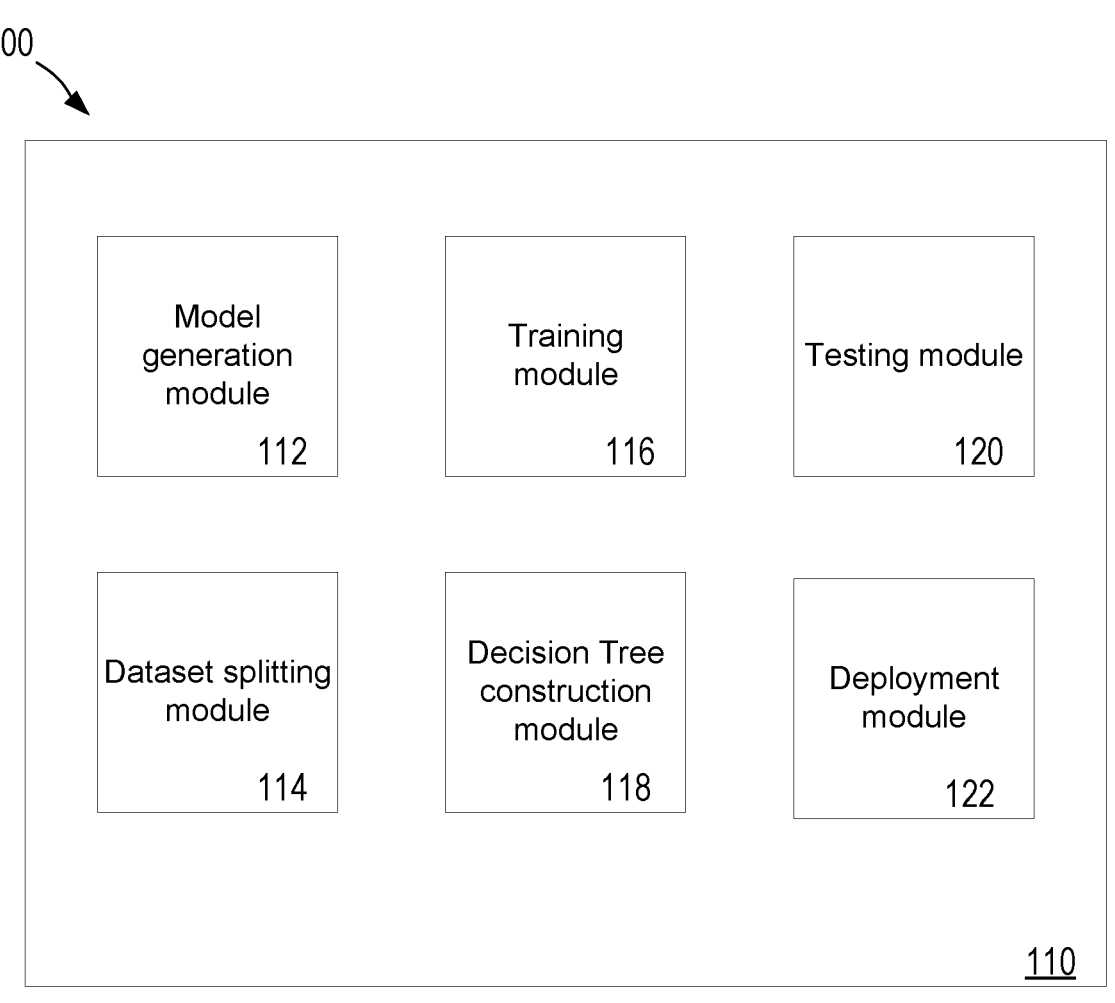
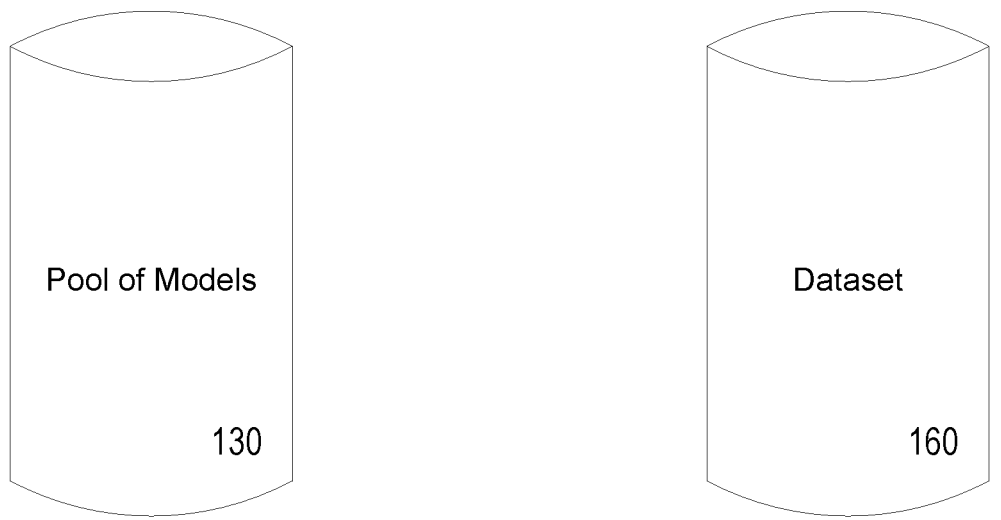
FIG. 1

300

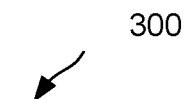

| Generate a plurality of models |
| :---: |
| 302 |

▼

| Split a dataset into a first set of training data and a second set of testing data |
| :---: |
| 304 |

▼

| Train each model of the plurality of models using the first set of training data to generate a plurality of trained models |
| :---: |
| 306 |

▼

| Construct a plurality of decision trees, the plurality of decision trees comprising one or more trained models of the plurality of trained models, wherein each of the plurality of decision trees is unique |
| :---: |
| 308 |

▼

| Test each of the plurality of decision trees with the second set of training data to generate an accuracy result for each decision tree of the plurality of decision trees |
| :---: |
| 310 |

▼

| Deploy a decision tree of the plurality of decision trees having a highest accuracy result. |
| :---: |
| 312 |

FIG. 3

DECISION TREE OF MODELS: USING DECISION TREE MODEL, AND REPLACING THE LEAVES OF THE TREE WITH OTHER MACHINE LEARNING MODELS

BACKGROUND

Machine learning uses training data to improve computer algorithms using training data. The algorithms go through improved decision making or predicting outcomes based on inputs to the machine learning model. The relationship between an input and an output is what a model is trained on and that relationship is what a model eventually tries to predict for a particular input, after the model has been trained. A basic form of machine learning is the perceptron, which classifies an input based on an expected class as learned from the overall model's training. The perceptrons may occupy hidden layers of the neural network, which are layers that an input may pass through before the neural network returns an output.

Due to machine learning algorithms potentially being applied to data that is outside of the training set of data, inaccuracies may arise in expected output results. There are multiple different potential algorithms that can be used for different intended applications. However, each potential algorithm can see varying success with respect to each intended application.

While extensive analytics can help understand algorithms with respect to specific applications better, doing so requires intensive effort and time, which may not be ultimately beneficial in the time saved from initially implementing the machine learning algorithms. A better understanding of model implementation and improvement on accuracy is needed in the art.

SUMMARY

Neural networks use a tree of inputs and outputs to train on. A neural network uses its algorithm to provide an output to particular inputs, based on the trained experiences of the neural network. The determination that an input results in a particular output is known as a perceptron.

However, a particular model and its various perceptrons may only have a level of accuracy that is not optimal for a particular application. An improved understanding of which model may be the most suitable can be measured off of accuracy reports from running training sets and test sets derived from the same dataset. Moreover, utilizing the dataset to understand accuracy can improve understandings of hidden trends and the diversity of decision capabilities across a network.

Generally, techniques for generating and training a neural network is described. The method of training may provide for generating a neural network of machine learning models, where additional models may be provided as the output of perceptrons, forming a "tree" of different models. From this "tree," a dataset can be split into a first set and a second set, the first set to train the "tree" of models, and the second set to test the accuracy of the models. The accuracy of models can be backpropagated to provide the neural network with better approximations of what models may be better employed in layers further down the neural network.

In some embodiments, a method is provided that includes generating a plurality of models, splitting a dataset into a first set of data and a second set of data, training each model of the plurality of models using the first set of data to generate a plurality of trained models, constructing a plurality of decision trees, testing each of the plurality of decision trees with the second set of data to generate an accuracy indicator for each decision tree of the plurality of decision trees, and deploying a decision tree of the plurality of decision trees having a highest accuracy indicator. The first set of data can have training data and the second set of data can have testing data. The plurality of decision trees can have one or more trained models of the plurality of trained models, with each of the plurality of decision trees being unique.

In some embodiments a system is provided that includes a dataset, one or more processors, and a system memory storing instructions to cause the one or more processors to generate a plurality of models, split a dataset into a first set of data and a second set of data, train each model of the plurality of models using the first set of data to generate a plurality of trained models, construct a plurality of decision trees, test each of the plurality of decision trees with the second set of data to generate an accuracy indicator for each decision tree of the plurality of decision trees, and deploy a decision tree of the plurality of decision trees having a highest accuracy indicator. The first set of data can have training data and the second set of data can have testing data. The plurality of decision trees can have one or more trained models of the plurality of trained models, with each of the plurality of decision trees being unique.

Implementations of the computer-implemented method can include one or more of the following features. In some embodiments, the first set of data can form a larger portion of the dataset than the second set of data. In some embodiments, constructing the plurality of decision trees includes constructing a maximum number of unique decision trees from the plurality of trained models. In some embodiments, the plurality of models includes at least a linear regression model. In some embodiments, deploying the decision tree with the highest accuracy indicator can include deploying the decision tree with the highest accuracy indicator to other neural networks. In some embodiments, constructing the decision trees can include backpropagation of the training of each model to affect a sequence of a decision tree of the plurality of decision trees. In some embodiments, the accuracy indicator associated with a given decision tree indicates an accuracy of a decision made by the given decision tree. In some embodiments, each of the plurality of models can have a hyperparameter, and the neural network can include a set of hyperparameters of each of the plurality of models of the decision tree, with training of a given model being based on the hyperparameter associated with a given model.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 1 illustrates an intelligence system for generating and training a neural network, according to embodiments.

FIG. 3 illustrates a method of training a neural network, according to embodiments.

DETAILED DESCRIPTION

Figure 2A:
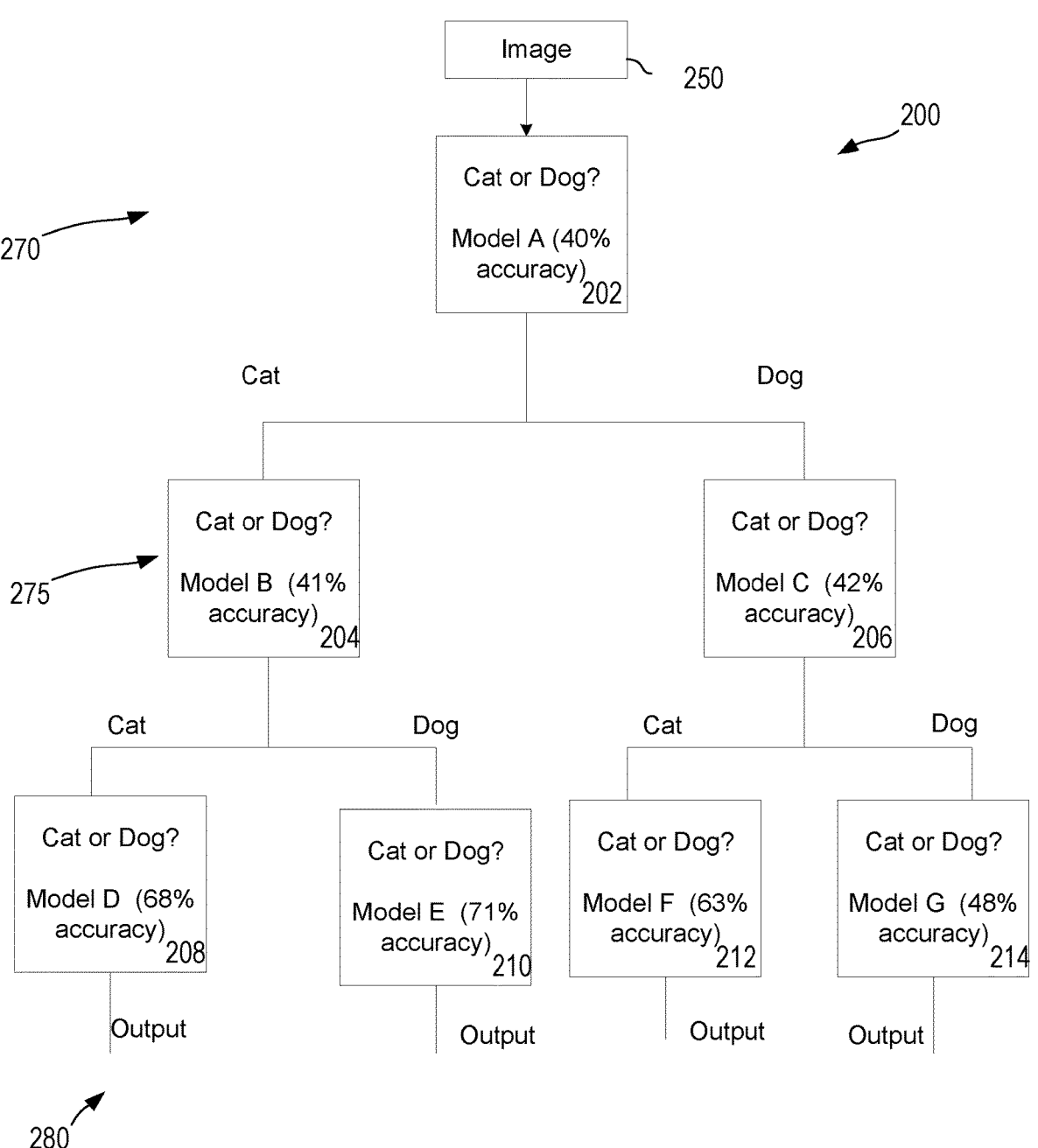
FIG. 2A illustrates a neural network made of models in the varying layers, according to embodiments.

In implementing particular neural network models, additional improvements in accuracy can be implemented by building out a tree of additional models. For particular applications, training data may result in imperfect accuracy that is often reflected in machine learning models. To better acquire an accurate result, data can be sent through multiple models—however, with increasing numbers of models, the difficulty arises in ascertaining which combination of models results in the highest accuracy. Within an overarching neural network, individual perceptrons of the neural network can be replaced with full models, rather than a binary classifier, to form a tree of different models.

Utilizing backpropagation, features of machine learning algorithms, and a tree of different models, an improved accuracy across a network of models can be realized. Results obtained from a models training can be passed backwards to previous layers to impact the efficiency of a particular network. By implementing different models as the inputs and outputs of a neural network, training data and test data that passes through can be verified against itself, resulting in an analysis of the accuracy of models in particular modes of implementation. For example, vision systems can run data through multiple sets of models to provide for a more accurate vision assessment of what a sensor is receiving. A neural network of models can be used to generate better dataset accuracy across the models.

FIG. 1 is an exemplary intelligence system 100 for generating and training a neural network. The intelligence system 100 may have a server 110, a pool of models 130, and a dataset 160. The intelligence system 100, while showing a server, can, in varying embodiments, reside within the same system memory, on one or more computing devices, such as computing device 500 described below with respect to FIG. 5, computing system 402, as described with respect to FIG. 4, a server, such as server 630 as described with respect to FIG. 6, or any suitable form of computer-readable medium.

The pool of models 130 can be a pool of different machine learning models or algorithms that interacts with the server 110, when generating and training the neural network. The various types of models can, for example, be a linear regression model, a logistic regression model, decision trees, gradient descent model or any suitable implementable machine learning model. In embodiments, when generating a neural network, the models pulled from the pool of models 130 can make up sub-models of the overarching model. The pool of models 130 can, in embodiments, have models that are already trained on training data from the dataset 160. The models may each have a hyperparameter, which influence the structure of the model and affect how the model is trained. The hyperparameter may be set prior to training a model.

The dataset 160 can be training examples, or input/output pairs for training a machine learning model. In embodiments, the examples within the dataset 160 can be particularly suited for vehicle models, such as autonomous driving models, computer vision models, or suitable vehicle-related datasets. The dataset 160 can be passed to the server 110 via any suitable electronic communication protocol.

The server 110 has a model generation module 112, a dataset splitting module 114, a training module 116, a decision tree construction module, a testing module 120, and a deployment module 122. The server may be a data center, computer, a virtual machine, or any suitable server for storing the various modules described herein.

The model generation module 112 generates various models from the pool of models 130. The set of models generated by the model generation module 112 can randomly pull models, such as, for example, a classification model, a linear regression model, a stochastic gradient descent model, a Naive Bayes model, k-means models, and any other suitable machine learning models.

The dataset splitting module 114 may split the data pulled from the dataset 160 into two different sets: a first set of data that can be used as a training dataset and a second set of data that can be used as a testing dataset. In embodiments, the dataset splitting module 114 may split the dataset such that 80% of the dataset is used as training samples in the first dataset while 20% of the dataset is used as testing samples in the second dataset. In embodiments, the dataset splitting module 114 may also divide the dataset such that the training samples is 50%, 60%, 70%, 90% or any other suitable percentage of the total dataset, with the remaining percentage of the dataset being used for the testing sample.

The training module 116 can take the models in combination with the percentage of the data that was split as the training dataset in order to train the models provided from the model generation module 112. The training module 116 can then pass the training dataset through each tree to further train the models using the training dataset.

The decision tree construction module 118 can take the various trained models from the training module 116 and construct different decision trees, with each node of the decision tree being a different trained model. The construction of each tree node of the tree may be completely random, and the decision tree construction module 118 can prepare as many trees suitable for a purpose. In embodiments, the number of trees prepared can be as decided by an operator, a processor, a preset algorithm, or any other suitable method for determining the number of trees to generate. For example, for a given number of trained models, a maximum number of unique decision trees may be constructed. In some embodiments, the maximum number may be all the permutations of the number of different trained models by the number of nodes in a decision tree. Likewise, the number of nodes and branches a decision tree has can similarly be decided by an operator, a processor, a preset algorithm, or any suitable method. Each decision tree can have a hyperparameter that affects how the decision tree is constructed and trained. For a decision tree made of many models, the hyperparameter can be a set of hyperparameters of each model that occupies the various nodes of the decision tree.

In embodiments, the decision trees that are constructed may not have models occupying every node. For example, a decision tree can be a combination of perceptrons, classifiers, and models working in the same hidden layers to return the output or determination of each layer. In embodiments, the perceptrons in previous layers may be used to probabilistically infer what other models to use in layers coming after the perceptrons. For example, if a perceptron outputs a particular inaccurate classification at a high percentage, the model may use an accuracy indicator from that particular perceptron to infer what model may come further downstream in order to account for the inaccuracy.

After the various decision trees are generated, the decision tree construction module 118 passes the decision trees to the testing module 120, which takes the portion of the dataset that was reserved for testing and tests each tree with the dataset for accuracy. Each decision tree returns an accuracy indicator indicating an accuracy of the tested dataset, determined by the results for each model at each node of the decision tree, based on the testing data. The accuracy indicator is a result obtained from the models based on the accuracy of a decision from a particular model. Each model has its own accuracy indicator resulting from the tested dataset and each tree has an overall accuracy indicator resulting from the tested dataset passing through the entire tree. For two different decision trees that may have the same models but in different orders, an overall accuracy indicator may be different between the two decision trees—the order or the models within the trees may provide a unique accuracy indicator as dependent on the sequencing of the models, nodes, or classifiers within and across layers.

The accuracy indicators are passed to the deployment module 122, which then deploys the decision tree with the highest overall accuracy indicator. The deployment can be through a server, such as server 630, as described in FIG. 6 below or to additional decision trees and models. For example, a particular decision tree that returns the highest accuracy indicator for determining whether an image is a cat or a dog may be deployed to another neural network for determining what type of animal a particular image is.

As an example, FIG. 2A shows an exemplary decision tree 200 associated with a training data set as described above. Decision tree 200 can be generated using a decision tree construction module, such as decision tree construction module 118. Decision tree 200 has layers 270, 275, and 280. In layer 270, any input, such as input 250, is passed through Model A 202. In layer 275, any output of Model B 204 or Model C 206 is passed to layer 280. One or more nodes 202-214 of decision tree 200 may each be associated with a different model. Decision tree 200, as an example, can be a decision tree for a neural network for determining whether an image includes a cat or a dog with a different model occupying each node.

The decision tree 200 receives an input 250. The input 250 is an image including either a cat or a dog. The input 250 is passed to the model A 202, which makes a determination based on its training, as to whether the input 250 includes a cat or a dog. However, rather than output the determination, as a normal model might, the model passes the input 250 to another model based on the determination of model A 202. For example, model A 202 may pass the input 250 to model B 204, if model A 202 determines that the input includes a cat. Model A 202 may pass the input 250 to model C 206, if model A 202 determines that the input includes a dog. Likewise, from model B 204, the input 250 gets passed to model D 208 or model E 210 based on the determination of model B 204, and from model C 206, the input 250 gets passed to model F 212 and model G 214 based on the determination of model C 206. While exemplary decision tree 200 shows 7 models, the decision tree may have more or fewer models as suitable for different applications. For example, the decision tree may have 2, 3, 4, 5, 6, 8, 9, 10, or more models.

Each model may have an individual accuracy indicator due to influence from the training set on each respective model. For example, in embodiments, model A 202 may have a 40% accuracy. Model B 204 may have a 41% accuracy. Model C 206 may have a 42% accuracy. Model D 208 may have a 68% accuracy. Model E 210 may have a 71% accuracy. Model F 212 may have a 63% accuracy. Model G 214 may have a 48% accuracy. However, in particular sequences, the decision tree may have a higher accuracy than each of its individual models. For example, the decision tree 200, as shown in this embodiment, can have an overall accuracy of 86% in determining whether an image is a cat or a dog.

By placing the models in particular sequences, hidden properties, metadata, and other aspects not readily apparent of the dataset may be processed and used to provide a more accurate overall model. The decision tree has an improved accuracy over each individual model due to specific sequences generated from the decision tree. The decision tree 200 may be one decision tree of many generated by a decision tree construction module, such as decision tree construction module 118. The particular arrangement of models shown may have a higher accuracy than other decision trees generated by the decision tree construction module, and higher accuracy than even decision trees with the same models but in different sequential downstream order.

While FIG. 2A shows models occupying the nodes of each of layer 270, 275, and 280, as discussed further below, the nodes do not have to be occupied by a model. For example, as can be seen in FIG. 2B, some embodiments of the models may occupy a partial portion of the nodes rather than each node of the decision tree, as the embodiment of FIG. 2A shows.

Figure 2B:
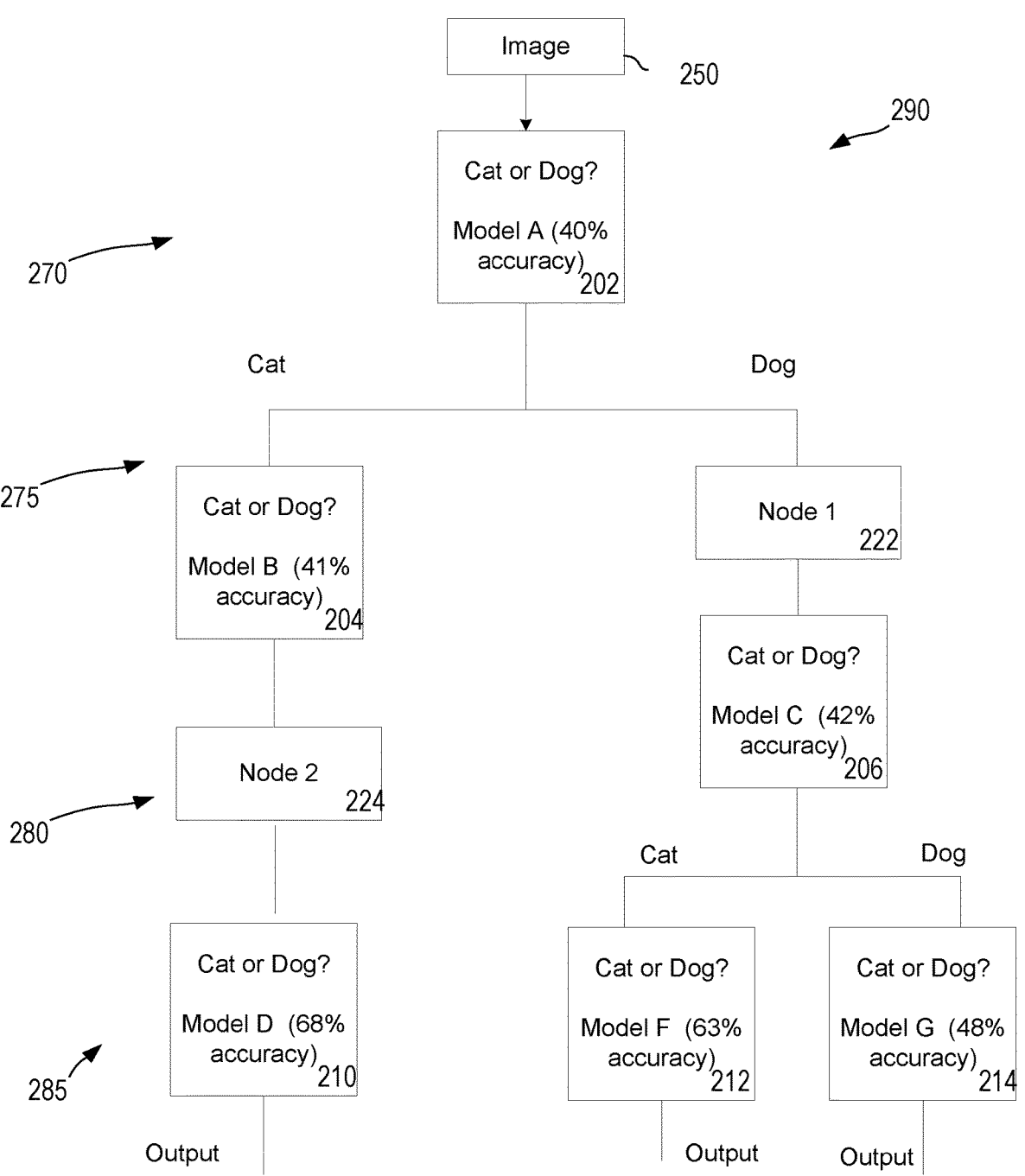
FIG. 2B illustrates a neural network including additional models and perceptrons at various nodes in the varying layers, according to embodiments.

FIG. 2B shows an exemplary decision tree 290 associated with a training set for determining if an image is a cat or a dog. Decision tree 290 has layer 270 with model A 202, layer 275 with model B 204 and node 1 222, layer 280 with node 2 224 and model C 206, and layer 285 with model D 210, model F 212 and model G 214. Decision tree 290 can use different modules at the nodes, such as transformations, scalars, or other data modifiers in place of models. For example, node 1 222 or node 2 224 can be a mapping transformation of the input 250, which is passed directly to model C 206 or model D 210, respectively. In embodiments, node 1 222 or node 2 224 can be other operations, such as a scalar multiplier, transposition, or any other transformative operation.

Thus, in operation, the input 250 would be passed to model A 202, which makes a determination if the input 250 is a cat or a dog based on its previous training. If model A 202 determines the input 250 is a cat, the input 250 gets passed to model B 204, and if the input 250 is determined to be a dog it gets passed to node 222. Model B passes the input 250 to node 224 which then passes the input 250 to model D 210 which outputs a determination if the input 250 is a cat or a dog. Node 1 222 passes the input 250 to model C 206, which makes a determination if the input 250 is a cat or a dog. If the input 250 is determined to be a cat, it gets passed to model F 212 and if the input 250 is determined to be a dog, it gets passed to model G 214, which both provide an end output.

FIG. 3 is a method 300 of generating and training a neural network. The neural network can be generated and trained, in embodiments, by an intelligence system, such as intelligence system 100, described above with respect to FIG. 1.

In step 302, a plurality of models is generated. The plurality of models can be machine learning models, such as classification models, regression models, gradient descent models, Naive Bayes models, or other suitable machine learning models. The plurality of models can be generated by a model generation module, such as model generation module 112, from a pool of models, such as the pool of models 130.

In step 304, a dataset, such as the dataset 160, is split into a training data set and a testing dataset. For example, in embodiments, the dataset 160 can be split such that the training dataset makes up 80% of the dataset, and the testing data makes up 20% of the dataset. In embodiments, the training data may be made up by 50%, 60%, 70%, 90% or otherwise of the dataset, with the testing dataset being made up by the remaining portion of the dataset not used for the training data.

In step 306, each model of the plurality of models is trained with the training data set. The models may be trained through a training module, such as training module 116. The training set passes through each model in order to train the models for the particular task the dataset is geared towards. For example, for a dataset geared towards determining whether an image includes a cat or a dog, as above in FIGS. 2A-2B, the models would be trained on data reflecting images that include either cats or dogs.

In step 308, a plurality of decision trees are constructed. Each of the plurality of decision trees contains one or more of the trained models of step 306, and each of the plurality of decision trees is unique within the plurality of decision trees. In embodiments, a decision tree may use the same trained models as another decision tree in a different sequence and still be unique. In embodiments, the decision trees may have completely different models between one decision tree and another decision tree.

In step 310, the plurality of decision trees constructed in step 308 is tested with the portion of the dataset split for testing, as described above in step 304. Based on the testing of each decision tree, an accuracy indicator is obtained. In embodiments, the accuracy indicator can be an accuracy indicator for each individual model of the decision tree. In embodiments, the accuracy indicator also includes the overall accuracy of the entire decision tree, as described above with respect to FIG. 2.

In step 312, the accuracy indicator obtained in step 310 is used to deploy a decision tree with the highest accuracy indicator. The deployment can be through a server, such as server 630, as described in FIG. 6, a system memory, a computer readable medium, or otherwise suitable for interfacing with a processor. For example, the decision tree deemed with the highest accuracy may be deployed through a dongle that is meant for interfacing with a vehicle.

Figure 4:
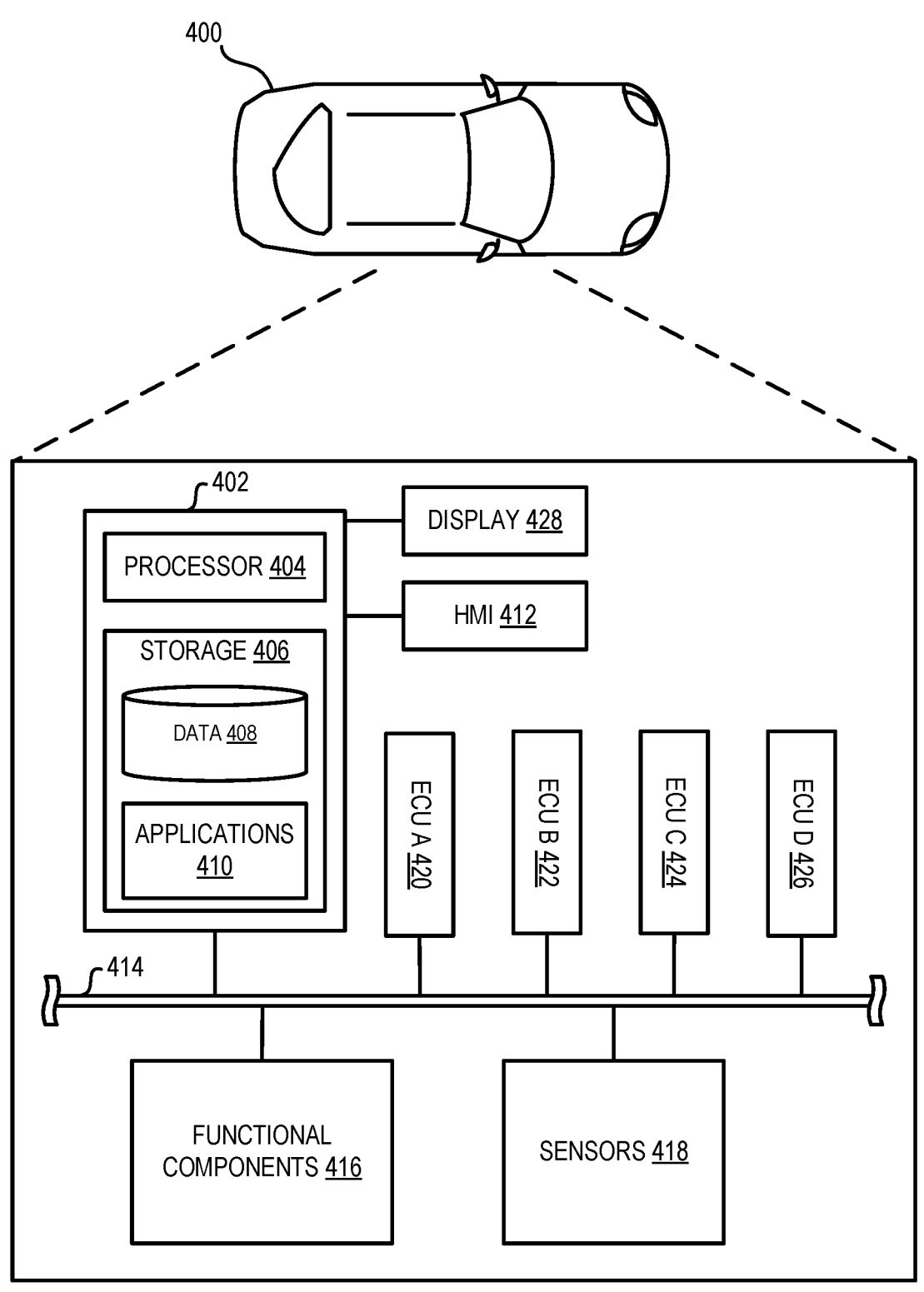
FIG. 4 illustrates a block diagram of a vehicle system, according to some embodiments.
Figure 5:
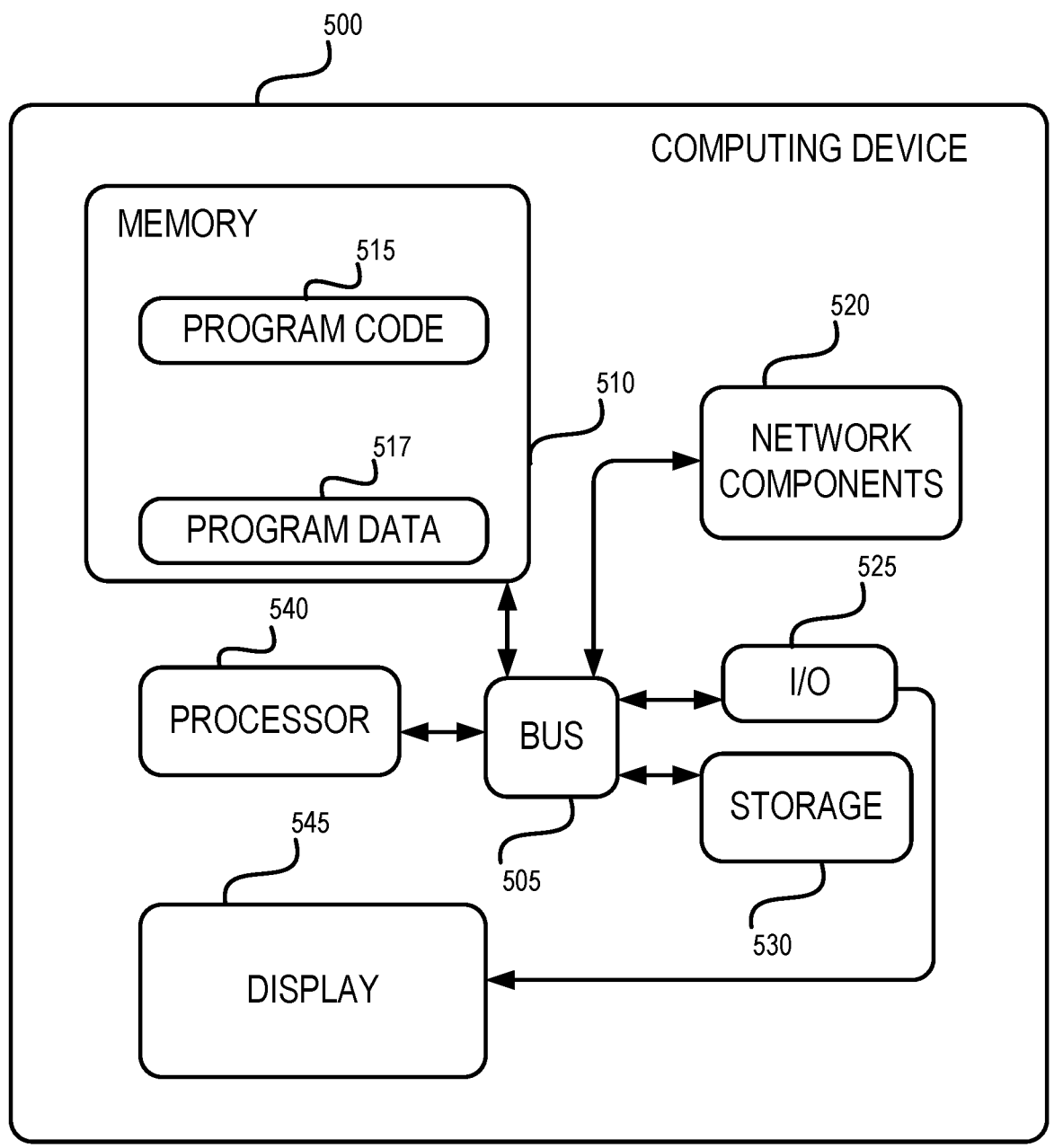
FIG. 5 illustrates a block diagram of a computing system, according to some embodiments.

Any suitable computing system or group of computing systems can be used for performing the operations or methods described herein. For example, FIG. 4 illustrates a vehicle system including a computing system 402 as well as multiple ECUs which may perform some or all of the functions described herein. FIG. 5 further depicts an example of a computing device 500 that may be at least a portion of computing system 402.

FIG. 4 illustrates a block diagram of a vehicle system 400, according to some embodiments. The vehicle system 400 may include a computing system 402 configured to communicate over an in-vehicle network 414. The computing system 402 includes a processor 404 and storage 406. While a vehicle system 400 is shown in FIG. 4, the example components as illustrated are not intended to be limiting. Indeed, the vehicle system 400 may have more or fewer components, and additional or alternative components and/ or implementations may be used. It should be noted that the use of a vehicle system 400 environment is illustrative, as the components and/or functionality may be utilized in other types of systems such as flight control system in an airplane, or a medical device or industrial machine.

The vehicle system 400 may include various types of automobile, crossover utility vehicle (CUV), sport utility vehicle (SUV), truck, recreational vehicle (RV), boat, plane or other mobile machine for transporting people or goods. In many cases, the vehicle system 400 may be powered by an internal combustion engine. As another possibility, the vehicle system 400 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of the vehicle system 400 may vary, the capabilities of the vehicle system may correspondingly vary. As some other possibilities, vehicle system 400 may have different capabilities with respect to passenger capacity, towing ability and capacity, and storage volume.

The computing system 402 may include a Human Machine Interface (HMI) 412 and a display 428 for user interaction with the computing system 402. An example computing system 402 may be the SYNC™ system provided by FORD MOTOR COMPANY™ of Dearborn, Michigan In some examples the display 428 may include a vehicle infotainment system including one or more displays. The HMI 412 may be configured to support voice command and BLUETOOTH™ interfaces with the driver and driver carry-on devices, receive user input via various buttons or other controls, and provide vehicle status information to a driver or other vehicle system 400 occupants. For instance, the computing system 402 may interface with one or more buttons or other HMI 412 configured to invoke functions on the computing system 402 (e.g., steering wheel audio buttons, a push-to-talk button, instrument panel controls, etc.). The computing system 402 may also drive or otherwise communicate with the display 428 configured to provide visual output to vehicle occupants, e.g., by way of a video controller. In some cases, the display 428 may be a touch screen further configured to receive user touch input via the video controller, while in other cases the display 428 may be a display only, without touch input capabilities. In an example, the display 428 may be a head unit display included in a center console area of the vehicle system 400. In another example, the display 428 may be a screen of a gauge cluster of the vehicle system 400.

The computing system 402 may further include various types of computing apparatus in support of performance of the functions of the computing system 402 described herein. In an example, the computing system 402 may include one or more processors 404 configured to execute computer instructions, and a storage 406 medium on which computer-executable instructions and/or data may be maintained. A computer-readable medium (also referred to as a processor-readable medium or storage 406) includes any non-transitory (e.g., tangible) medium that participates in providing data (e.g., instructions) that may be read by a computer (e.g., by the one or more processors 404). In general, the processor 404 receives instructions and/or data, e.g., from the storage 406, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C#, Fortran, Pascal, Visual Basic, Python, Java Script, Perl, PL/SQL, etc. The storage 406 may include divisions for data 408 and applications 410. The data 408 may store information such as databases and other such information. The applications 410 may store the computer-executable instructions or other such instructions executable by the processor 404.

The computing system 402 may be configured to communicate with mobile devices of the vehicle system 400 occupants. The mobile devices may be any of various types of portable computing device, such as cellular phones, tablet computers, smart watches, laptop computers, portable music players, or other devices capable of communication with the computing system 402. As with the computing system 402, the mobile device may include one or more processors configured to execute computer instructions, and a storage medium on which the computer-executable instructions and/or data may be maintained. In some examples, the computing system 402 may include a wireless transceiver (e.g., a BLUETOOTH™ controller, a ZIGBEE™ transceiver, a Wi-Fi transceiver, etc.) configured to communicate with a compatible wireless transceiver of the mobile device. Additionally, or alternately, the computing system 402 may communicate with the mobile device over a wired connection, such as via a USB connection between the mobile device and a Universal Serial Bus (USB) subsystem of the computing system 402.

The computing system 402 may be further configured to communicate with other components of the vehicle system 400 via one or more in-vehicle networks 414. The in-vehicle networks 414 may include one or more of a vehicle controller area network (CAN), an Ethernet network, or a media oriented system transfer (MOST), as some examples. The in-vehicle networks 414 may allow the computing system 402 to communicate with other units of the vehicle system 400, such as ECU A 420, ECU B 422, ECU C 424, and ECU D 426. The ECUs 420, 422, 424, and 426 may include various electrical or electromechanical systems of the vehicle system 400 or control various subsystems of the vehicle system 400. Some non-limiting examples of ECUs include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle system 400); a radio transceiver module configured to communicate with key fobs or other vehicle system 400 devices, a climate control management module configured to provide control and monitoring of heating and cooling system components (e.g., compressor clutch and blower fan control, temperature sensor information, etc.) as well as a transmission control module, a brake control module, a central timing module, a suspension control module, a vehicle modem (which may not be present in some configurations), a global positioning system (GPS) module configured to provide vehicle system 400 location and heading information, and various other vehicle ECUs configured to corporate with the computing system 402. The subsystems controlled by the various ECUs may include functional components 416 of the vehicle system 400 including elements such as the powertrain, engine, brakes, lights, steering components, and the like. Additionally, some or all of the functional components 416 may include sensors 418 as well as additional sensors equipped to the vehicle system 400 for detecting various states, positions, proximity, temperature, and the like of the vehicle system 400 and subsystems thereof. The ECUs 420, 422, 424, 426 may communicate with the computing system 402 as well as the functional components 416 and the sensors 418 over the in-vehicle network 414. While only four ECUs are depicted in FIG. 4, any number (more or fewer) of ECUs may be included in vehicle system 400.

FIG. 5 illustrates a block diagram of an example of a computing device 500. Computing device 500 can be any of the described computers herein including, for example, computing system 402 within the vehicle system 400 of FIG. 4 as well as ECUs 420, 422, 424, 426. The computing device 500 can be or include, for example, an integrated computer, a laptop computer, desktop computer, tablet, server, or other electronic device.

The computing device 500 can include a processor 540 interfaced with other hardware via a bus 505. A memory 510, which can include any suitable tangible (and non-transitory) computer readable medium, such as RAM, ROM, EEPROM, or the like, can embody program components (e.g., program code 515) that configure operation of the computing device 500. Memory 510 can store the program code 515, program data 517, or both. In some examples, the computing device 500 can include input/output ("I/O") interface components 525 (e.g., for interfacing with a display 545, keyboard, mouse, and the like) and additional storage 530.

The computing device 500 executes program code 515 that configures the processor 540 to perform one or more of the operations described herein. Examples of the program code 515 include, in various embodiments logic flowchart described with respect to FIG. 1 above. The program code 515 may be resident in the memory 510 or any suitable computer-readable medium and may be executed by the processor 540 or any other suitable processor.

The computing device 500 may generate or receive program data 517 by virtue of executing the program code 515. For example, sensor data, trip counter, authenticated messages, trip flags, and other data described herein are all examples of program data 517 that may be used by the computing device 500 during execution of the program code 515.

The computing device 500 can include network components 520. Network components 520 can represent one or more of any components that facilitate a network connection. In some examples, the network components 520 can facilitate a wireless connection and include wireless interfaces such as IEEE 802.11, BLUETOOTH™, or radio interfaces for accessing cellular telephone networks (e.g., a transceiver/antenna for accessing CDMA, GSM, UMTS, or other mobile communications network). In other examples, the network components 520 can be wired and can include interfaces such as Ethernet, USB, or IEEE 1394.

Although FIG. 5 depicts a computing device 500 with a processor 540, the system can include any number of computing devices 500 and any number of processor 540. For example, multiple computing devices 500 or multiple processor 540 can be distributed over a wired or wireless network (e.g., a Wide Area Network, Local Area Network, or the Internet). The multiple computing devices 500 or multiple processor 540 can perform any of the steps of the present disclosure individually or in coordination with one another.

Figure 6:
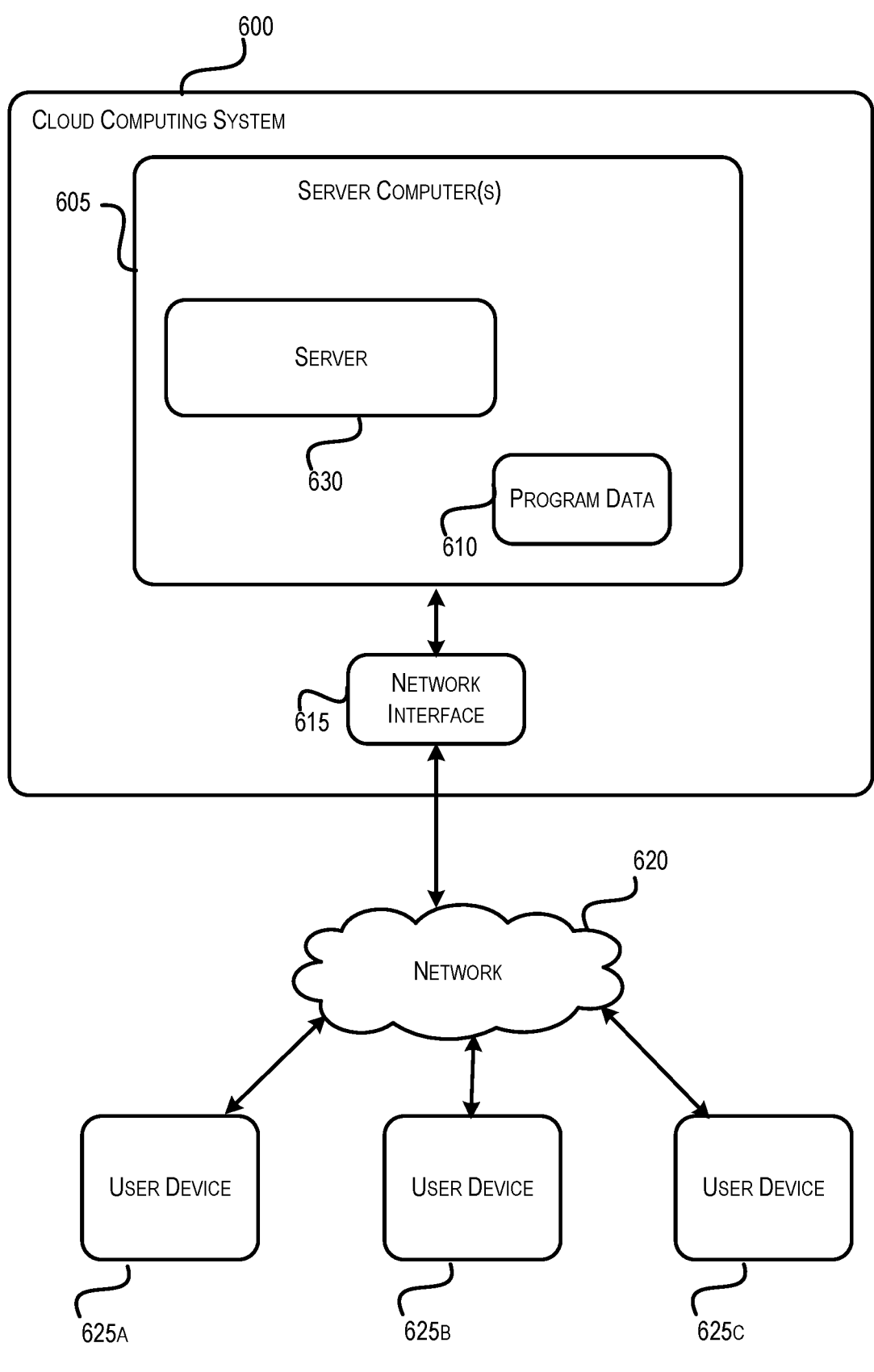
FIG. 6 illustrates a cloud computing system, according to some embodiments.

In some embodiments, the functionality provided by the computing device 600 may be offered as cloud services by a cloud service provider. For example, FIG. 6 depicts an example of a cloud computing system 600 offering an intelligence service that can be used by a number of user subscribers using user devices 625a, 625b, and 625c across a data network 620. User devices 625a, 625b, and 625c could be examples of a vehicle system 400 described above. In the example, the intelligence service may be offered under a Software as a Service (SaaS) model. One or more users may subscribe to the intelligence service, and the cloud computing system performs the processing to provide the intelligence service to subscribers. The cloud computing system may include one or more remote server computers 605.

The remote server computers 605 include any suitable non-transitory computer-readable medium for storing program code (e.g., server 630) and program data 610, or both, which is used by the cloud computing system 600 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 605 can include volatile memory, non-volatile memory, or a combination thereof.

One or more of the server computers 605 execute the program data 610 that configures one or more processors of the server computers 605 to perform one or more of the operations that determine locations for interactive elements and operate the adaptive rule-based system. As depicted in the embodiment in FIG. 6, the one or more server computers 605 provide the services to perform the adaptive rule-based system via the server 630. Any other suitable systems or subsystems that perform one or more operations described herein (e.g., one or more development systems for configuring an interactive user interface) can also be implemented by the cloud computing system 600.

In certain embodiments, the cloud computing system 600 may implement the services by executing program code and/or using program data 610, which may be resident in a memory device of the server computers 605 or any suitable computer-readable medium and may be executed by the processors of the server computers 605 or any other suitable processor.

In some embodiments, the program data 610 includes one or more datasets and models described herein. Examples of these datasets include dealership data, classification data, etc. In some embodiments, one or more of data sets, models, and functions are stored in the same memory device. In additional or alternative embodiments, one or more of the programs, data sets, models, and functions described herein are stored in different memory devices accessible via the data network 620.

The cloud computing system 600 also includes a network interface device 615 that enable communications to and from cloud computing system 600. In certain embodiments, the network interface device 615 includes any device or group of devices suitable for establishing a wired or wireless data connection to the data networks 620. Non-limiting examples of the network interface device 615 include an Ethernet network adapter, a modem, and/or the like. The server 630 is able to communicate with the user devices 625a, 625b, and 625c via the data network 620 using the network interface device 615.

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device. The order of the blocks presented in the examples above can be varied—for example, blocks can be re-ordered, combined, and/or broken into sub-blocks. Certain blocks or processes can be performed in parallel.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A computer-implemented method for generating and training a neural network, the method comprising:

generating a plurality of models;

splitting a dataset into a first set of data and a second set of data, wherein the first set of data comprises training data and the second set of data comprises testing data;

training each model of the plurality of models using the first set of data to generate a plurality of trained models, wherein training comprises forward-propagating the first set of data through a respective model of the plurality of models and backpropagating based on results of the forward propagating;

generating a plurality of permutations associated with the plurality of trained models;

constructing, for each permutation of the plurality of permutations, a corresponding decision tree, that comprises one or more of the plurality of trained models arranged as nodes in an order defined by that permutation, to produce a plurality of decision trees, wherein constructing the plurality of decision trees includes using backpropagated results of the training of the respective model to affect a sequence of models in each decision tree;

testing each trained model of the plurality of trained models with the second set of data to generate a respective model-specific accuracy indicator for each trained model of the plurality of trained models;

testing each decision tree of the plurality of decision trees with the second set of data;

generating, for each decision tree of the plurality of decision trees, an accuracy indicator based on:

the respective model-specific accuracy indicator, and results of testing a respective decision tree of the plurality of decision trees, associated with the respective model-specific accuracy indicator, wherein the accuracy indicator for a first decision tree of the plurality of decision trees is higher than the accuracy indicator for a second decision tree of the plurality of decision trees; and inputting the first decision tree to a processor of a vehicle system that executes another neural network.

2. The method of claim 1 wherein the first set of data forms a larger portion of the dataset than the second set of data.

3. The method of claim 1, wherein the constructing the plurality of decision trees includes constructing a maximum number of unique decision trees corresponding to all possible permutations of the plurality of trained models.

4. The method of claim 1, wherein the plurality of models includes at least a linear regression model.

5. The method of claim 1, wherein the other neural network interfaces with a vehicle.

6. The method of claim 1, wherein the constructing the plurality of decision trees comprises using backpropagating results of the training of each trained model of the plurality of trained models to influence an arrangement of the plurality of trained models in each decision tree of the plurality of decision trees.

7. The method of claim 1, wherein the accuracy indicator indicates an accuracy of a decision made by the first decision tree or the second decision tree.

8. The method of claim 1, wherein each decision tree, of the plurality of decision trees, corresponds to a respective permutation of the plurality of permutations and is constructed by arranging the plurality of trained models, as a plurality of nodes in the order defined by that permutation, with each node being a different trained model of the plurality of trained models.

9. A system for generating and training a neural network, the system comprising:

a dataset;

one or more memories; and one or more processors, coupled to the one or more memories, configured to:

generate a plurality of models;

split the dataset into a first set of data and a second set of data, wherein the first set of data comprises training data and the second set of data comprises testing data;

train each model of the plurality of models using the first set of data to create a plurality of trained models, wherein training comprises forward-propagating the first set of data through a respective model of the plurality of models and backpropagating based on results of the forward propagating;

generate a plurality of permutations associated with the plurality of trained models;

construct, for each permutation of the set of parameters, a corresponding decision tree that comprises one or more of the plurality of trained models arranged as nodes in an order defined by that permutation, to produce a plurality of decision trees, wherein constructing the plurality of decision trees includes using backpropagated results of the training of the respective model to affect a sequence of models in each decision tree;

test each trained model of the plurality of trained models with the second set of data a respective model-specific accuracy indicator for each trained model of the plurality of trained models;

test each decision tree of the plurality of decision trees with the second set of data;

generate, for each decision tree of the plurality of decision trees, an accuracy indicator based on;

the respective model-specific accuracy indicator, and results of testing a respective decision tree of the plurality of decision trees, associated with the respective model-specific accuracy indicator, wherein the accuracy indicator for a first decision tree of the plurality of decision trees is higher than the accuracy indicator for a second tree of the plurality of decision trees; and input the first decision tree to a processor of a vehicle system that executes another neural network.

10. The system of claim 9 wherein the first set of data forms a larger portion of the dataset than the second set of data.

11. The system of claim 9, wherein the constructing the plurality of decision trees includes constructing a maximum number of decision trees corresponding to all possible permutations of the plurality of trained models.

12. The system of claim 8, wherein each of the plurality of models has a hyperparameter, and the neural network includes a set of hyperparameters comprising the hyperparameter of each of the plurality of models, wherein a given model of the plurality of models is trained based on the hyperparameter associated with the given model.

13. The system of claim 12, wherein the neural network includes a set of hyperparameters comprising a connection between the plurality of models, wherein the corresponding decision tree is constructed based on the set of hyperparameters.

14. The system of claim 9, wherein the plurality of models includes at least a linear regression model.

15. The system of claim 9, wherein the accuracy indicator associated with the respective decision tree, of the plurality of decision trees, indicates an accuracy of a decision made by the respective decision tree.

16. The system of claim 9, wherein each decision tree, of the plurality of decision trees, corresponds to a respective permutation of the plurality of permutations and is constructed by arranging the plurality of trained models, as a plurality of nodes in the order defined by that permutation, with each node being a different trained model of the plurality of trained models.

17. A non-transitory computer-readable medium comprising instructions that, upon execution by one or more processors, cause the one or more processors to:

generate a plurality of models;

split a dataset into a first set of data and a second set of data, wherein the first set of data comprises training data and the second set of data comprises testing data;

train each model of the plurality of models using the first set of data to create a plurality of trained models, wherein training comprises forward-propagating the first set of data through a respective model of the plurality of models and backpropagating based on results of the forward propagating;

generate a plurality of permutations associated with the plurality of trained models;

construct for each permutation of the plurality of permutations, a corresponding decision tree that comprises one or more of the plurality of trained models arranged as nodes in an order defined by that permutation, to produce a plurality of decision trees, wherein constructing the plurality of decision trees includes using backpropagated results of the training of respective model to affect a sequence of models in each decision tree;

test each trained model of the plurality of trained models with the second set of data a respective model-specific accuracy indicator for each trained model of the plurality of trained models;

test each decision tree of the plurality of decision trees with the second set of data;

generating, for each decision tree of the plurality of decision trees, an accuracy indicator based on:

the respective model-specific accuracy indicator, and results of testing a respective decision tree of the plurality of decision trees, associated with the respective model-specific accuracy indicator, wherein the accuracy indicator for a first decision tree of the plurality of decision trees is higher than the accuracy indicator for a second tree of the plurality of decision trees; and input the first decision tree to a processor of a vehicle system that executes a neural network.

18. The non-transitory, computer-readable medium of claim 17, wherein the first set of data forms a larger portion of the dataset than the second set of data.

19. The non-transitory, computer-readable medium of claim 17, wherein the constructing the plurality of decision trees includes constructing a maximum number of decision trees corresponding to all possible permutations of the plurality of trained models.

20. The non-transitory computer-readable medium of claim 17, wherein each decision tree, of the plurality of decision trees, corresponds to a respective permutation of the plurality of permutations and is constructed by arranging the plurality of trained models, as a plurality of nodes in the order defined by that permutation, with each node being a different trained model of the plurality of trained models.

* * * * *